Patented Feb. 12, 1924.

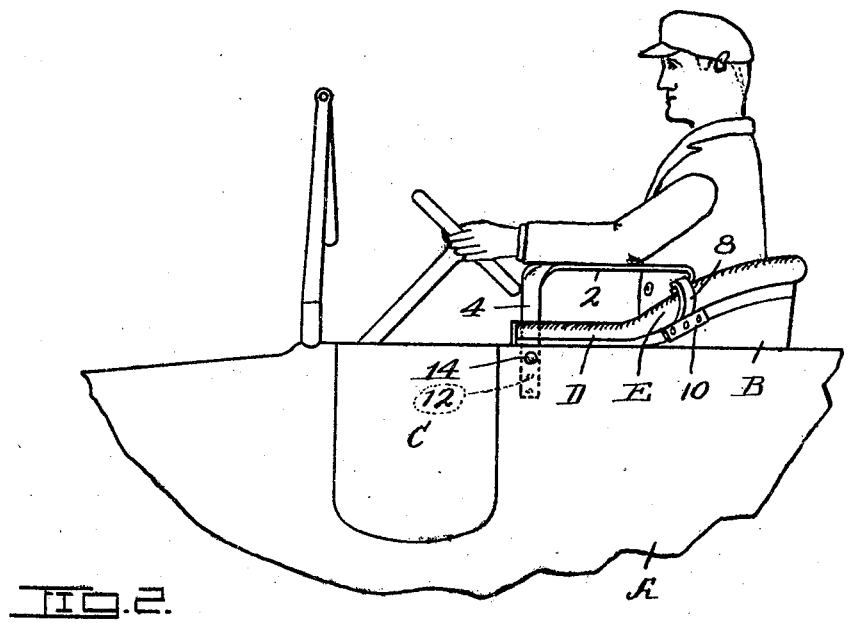

1,483,346

UNITED STATES PATENT OFFICE.

LAFE W. HARRIS AND MINNIE L. TAYLOR, OF KANSAS CITY, MISSOURI.

ARM REST.

Application filed November 10, 1922. Serial No. 600,030.

*To all whom it may concern:*

Be it known that we, LAFE W. HARRIS and MINNIE L. TAYLOR, citizens of the United States, residing at Kansas City, in the county of Jackson and State of Missouri, have invented certain new and useful Improvements in Arm Rests, of which the following is a specification.

Our invention relates to arm rests for use on popular types of cars in which the arms of the seat are too low to form a comfortable support for the arms of the occupants, and one object is to provide an arm rest of this character which will not interfere with the free ingress and egress through the doors of the automobile.

The devices are so formed that they may be readily applied to the arms of one or all seats of the motor vehicle, and while said devices may be made of any suitable material or combinations of materials, we prefer for the sake of economy to form said devices from sheet metal.

In order that the invention may be fully understood, reference will now be had to the accompanying drawings, in which:

Fig. 1 is a fragmentary side elevation of an automobile equipped with one of the devices.

Fig. 2 is a front elevation of one of the devices showing the manner in which its forward portion is attached to the automobile.

Fig. 3 is a detail perspective view of one of the devices.

A designates a portion of an automobile having a seat B with the usual arms D and doors C.

2 designates the arm support, the forward portion of which is bent downwardly to form a leg 4, while the rear portion is bent downwardly and forwardly to form a seat 6 to which the upper end of a bracket 8 is secured. The bracket 8 is bowed or curved outwardly to pass around the upper upholstered portion E of the arm D as shown by Fig. 1, and terminates in a transverse portion 10 which is secured to the back of the seat just beneath the upholstery as disclosed by Fig. 1.

The leg 4 at the forward portion of the arm support 2 is twisted a quarter of a turn, so that its lower portion will lie flat against the corresponding inner surface F of the automobile as shown by Fig. 2, where it is secured by suitable means such as screws 12 and a bolt 14.

From the foregoing description it will be understood that the device can be readily installed and will not only form a comfortable support for the arm but does not project over the door or doors C of the automobile and interfere with access to the seat or seats B.

While we have shown the preferred construction of the device we reserve the right to make such changes as properly fall within the spirit and scope of the claim.

Having thus described our invention, what we claim and desire to secure by Letters Patent, is:

A device of the character described consisting of an arm support, a curved bracket secured to the rear portion of said arm support and terminating in a transverse lower portion adapted to be secured to the back of a motor vehicle seat, a leg extending downwardly from the forward portion of the arm support and twisted to lie against the inner surface of the motor vehicle, substantially as shown and described.

In testimony whereof we affix our signatures, in the presence of two witnesses.

LAFE W. HARRIS.
MINNIE L. TAYLOR.

Witnesses:
L. J. FISCHER,
F. C. FISCHER.